United States Patent Office

3,007,792
Patented Nov. 7, 1961

3,007,792
PREPARATION OF SPONGY OR ULTRA-FINELY DIVIDED SUBSTANCES
Claude Ortlieb, Strasbourg, and Victor Sinn, Mulhouse, France, assignors to Laboratoire de Recherche et de Controle du Caoutchouc, Paris, France
No Drawing. Filed June 22, 1959, Ser. No. 821,668
Claims priority, application France July 2, 1958
5 Claims. (Cl. 75—66)

This invention relates to the preparation of metals and alloys or other substances or mixtures of substances in a finely divided or sponge-like form. The invention is especially directed to the preparation, in the form just specified, of alkali and alkali-earth metals adapted for use as polymerization catalysts, or as starting materials in the preparation of organo-metallic derivatives.

It is an object of the invention to permit the attainment of a substantially increased degree of division in the substances to be prepared and thereby, correspondingly, to improve the various operating parameters in the reactions in which the substances are ultimately involved, including time, temperature, yield, and the like, over what is achievable by conventional methods of preparing comparable divided compositions.

According to the invention, an extreme state of division is obtained by preparing one or more intermediate compounds or mixtures, capable by regeneration to yield the original or active substance, in a spongy or highly divided form.

The intermediate compounds or mixtures choosen will depend on the nature of the substance to be divided. In the case of alkali and alkali-earth metals for example, ammonia and/or amine compounds or mixtures thereof may be used. The regeneration process likewise depends in its character on the intermediate compounds or mixtures used. Thus, where the latter include ammonia or amine compounds or mixtures, the regeneration treatment would involve heating at a suitably elevated pressure.

The invention is further directed to methods of conditioning the ultra-finely divided substances produced, by incorporation thereof in an inert carrier medium of solid, liquid, or semi-solid character, with the object of facilitating manipulation in storage and in use. Again referring to the alkali and alkali-earth metals mentioned above as a preferred example, such a carrier medium may comprise Vaseline, paraffin or the like.

The following examples will serve to illustrate the invention, but should not be interpreted as limiting its scope.

*Example 1*

Lithium in the form of wire, cuttings and/or grains, is exposed to the action of ammonia vapor in a sealed container, substantially in the absence of air and moisture, and at ordinary ambient temperature; some agitation may be provided if desired. An addition product is formed which appears as a golden liquid.

The container is then connected with a vacuum pump and the pressure is reduced while, at the same time, heat is gradually applied but without attaining the melting point of the metal. The ammonia is thus eliminated. One convenient set of conditions in the case of lithium is a temperature of 100° C. and a reduced pressure of 15 mm. mercury.

The residual product obtained on complete removal of the ammonia is a spongy metal mass having high activity as a polymerization catalyst and also in the preparation of organo-lithic compounds. Desirably, during such manipulations, operations are carried out in an inert atmosphere such as light hydrocarbons, argon, helium or other inert gases.

The very high activity of the ultra-divided lithium thus produced as a polymerization catalyst, is demonstrated by the fact that butadiene monomer can be converted at ambient temperature, in the presence of 0.1% of the spongy lithium product, into a polymer titling 80% internal double-bonds. The polymerization reaction is completed within a few hours, provided the ammonia was completely removed.

In the above example, lithium may be replaced with other alkali metals.

*Example 2*

It is also possible, according to the invention, to start with compounds or mixtures that are richer in ammonia, the metal being dissolved in liquid ammonia so as to obtain a blue solution.

Thus, using about 10 grams lithium per 100 grams ammonia, the operation may proceed at ordinary temperature under elevated pressure, or at ordinary atmospheric pressure at reduced temperature.

The regeneration of the spongy metal in ultra-finely divided form is subsequently effected by the same procedure as in Example 1.

*Example 3*

The same procedure as in either of the foregoing examples is used, except that the ammonia is replaced with an amine, such as methylamine or ethylamine.

*Example 4*

The same procedure as in any one of the foregoing examples has been applied to alkali-earth metals.

*Example 5*

To facilitate manipulation of the products of the invention they are preferably incorporated in an inert carrier medium. Thus, as a non restrictive example, lithium or other alkali or earth-alkaline metal dissolved in ammonia or an amine is slowly poured, with strong stirring as with a rotary or vibrational stirrer, into Vaseline or paraffin in molten form or, more preferably, into a solution of Vaseline or paraffin in benzene or some other inert solvent. This operation should, of course, be carried out in the absence of moisture and air, e.g. in an atmosphere of argon or helium, or the like, and preferably in a stainless steel vessel.

The mixture is gradually heated under reduced pressure while continuing agitation, so as to eliminate the ammonia or amine with the solvent. On cooling, a pulp is obtained which can be readily handled in the presence of air.

*Example 6*

A 5% dispersion of lithium in Vaseline produced by the method disclosed in Example 5, was used to polymerize styrene in solution in tetrahydrofurane, whereby negative styryl ions were formed without any formation of intermediate naphthalene and lithium compounds.

A 50% mixture of styrene and tetrahydrofurane takes on a dark red color within 15 to 20 minutes, and polymerizes with a conversion ratio of approximately 100%. The resulting product has a molecular weight on the order of 50,000.

The only precautions to be observed, when operating in the presence of air, are to avoid agitation and heating.

We claim:

1. In a method of converting a metal selected from the group consisting of the alkali-metals and alkaline-earth metals to a mass having a high surface-to-volume ratio, the step of reacting said metal with ammonia, to provide an ammonia compound of said metal, and then heating the compound to eliminate the ammonia therefrom whereby to regenerate said metal in the form of a sponge-like or ultra-divided mass.

2. In a method of converting a metal selected from the group consisting of the alkali-metals and alkaline-earth metals to a mass having a high surface-to-volume ratio, the step of reacting said metal with an amine, to provide an amine compound of the metal, and decomposing said compound to restore said initial metal in a highly divided form.

3. A method of preparing from an initial substance selected from the group consisting of alkali-metals and alkaline-earth metals a mass having surface activity as a catalyst, which comprises reacting said initial substance with a substance selected from the group consisting of ammonia and an amine to form a compound of said metal selected from the group consisting of an ammonia compound and an amine compound, exposing said compound to decomposing conditions to restore said initial substance in the form of a highly divided mass, and incorporating said mass in an inert carrier medium.

4. In a method of converting a metal selected from the group consisting of the alkali-metals and alkaline-earth metals to a mass having a high surface-to-volume ratio, the step of reacting said metal with a substance selected from the group consisting of ammonia and an amine to form a compound of said metal selected from the group consisting of an ammonia compound and an amine compound, and then heating said compound to decompose said compound to restore the initial metal to a highly-divided state.

5. A method of converting lithium to a mass having a high surface-to-volume ratio comprising reacting the lithium with a substance selected from the group consisting of ammonia and an amine to form a compound of said metal selected from the group consisting of an ammonia compound and an amine compound, and then heating said compound to decompose said compound to restore the initial metal to a highly-divided state.

References Cited in the file of this patent

UNITED STATES PATENTS

| | | |
|---|---|---|
| 1,805,199 | Alleman | May 12, 1931 |
| 2,751,288 | Corneil | June 19, 1956 |